(12) United States Patent
Dybkjaer et al.

(10) Patent No.: US 7,060,118 B1
(45) Date of Patent: *Jun. 13, 2006

(54) SYNTHESIS GAS PRODUCTION BY STEAM REFORMING

(75) Inventors: Ib Dybkjaer, Copenhagen (DK); Peter Seier Christensen, Copenhagen (DK); Viggo Lucassen Hansen, Brønshøj (DK); J. R. Rostrup-Nielsen, Virum (DK)

(73) Assignee: Haldor Topse A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,528

(22) PCT Filed: Jul. 21, 1998

(86) PCT No.: PCT/EP98/04563

§ 371 (c)(1),
(2), (4) Date: Apr. 9, 2001

(87) PCT Pub. No.: WO00/05168

PCT Pub. Date: Feb. 3, 2000

(51) Int. Cl.
*B01J 8/00* (2006.01)

(52) U.S. Cl. .................. 48/127.9; 48/61; 48/62 R; 48/198.1; 48/198.7; 48/211; 48/214 R; 48/215; 422/188; 422/190; 422/192; 422/198; 422/200; 422/204; 423/650; 423/654; 252/373

(58) Field of Classification Search ............ 48/61, 48/127.9, 62 R, 198.1, 198.7, 211, 214 R, 48/215, 214 A, 89, 119, 120; 422/188–190, 422/192, 198, 200, 204, 211, 222; 423/650–654; 252/373

See application file for complete search history.

(56) References Cited

U.S. PATENT DOCUMENTS

| | | | |
|---|---|---|---|
| 4,019,969 A | 4/1977 | Golebiowski et al. | |
| 4,400,309 A | 8/1983 | McMahon et al. | |
| 5,167,865 A | * 12/1992 | Igarashi et al. | 252/373 |
| 5,932,141 A | * 8/1999 | Rostrop-Nielsen et al. | 252/373 |
| 6,086,839 A | * 7/2000 | Autenrieth et al. | 423/350 |

FOREIGN PATENT DOCUMENTS

| | | | |
|---|---|---|---|
| DE | 195 34 433 C1 | 10/1996 | |
| EP | 0305203 | 3/1989 | |
| EP | 0440258 | 8/1991 | |
| EP | 0583211 | 2/1994 | |
| EP | 0 855 366 B1 | 7/1998 | |
| JP | 48-084808 | 11/1973 | |
| JP | 53-082690 | 7/1978 | |
| JP | 61-097105 | 5/1986 | |
| JP | 62-216634 | 9/1987 | |
| JP | 05155602 | 6/1993 | |
| WO | WO 200003579 | * | 1/2000 |

OTHER PUBLICATIONS

I. Dybkjær, "Tubular Reforming and Autothermal Reforming of Natural Gas—An Overview of Available Processes", Fuel Processing Technology, vol. 42, No. 2/03, 1995, pp. 85-107.*

* cited by examiner

*Primary Examiner*—Glenn Caldarola
*Assistant Examiner*—Vinit H. Patel
(74) *Attorney, Agent, or Firm*—Needle & Rosenberg, P.C.

(57) ABSTRACT

Process for the preparation of hydrogen and carbon monoxide rich gas by steam reforming of hydrocarbon feedstock in presence of a steam reforming catalyst supported as thin film on the wall of a reactor, comprising steps of (a) optionally passing a process gas of hydrocarbon feedstock through a first reactor with a thin film of steam reforming catalyst supported on walls of the reactor in heat conducting relationship with a hot gas stream; (b) passing effluent from the first reactor to a subsequent tubular reactor being provided with a thin film of steam reforming catalyst and/or steam reforming catalyst pellets and being heated by burning of fuel, thereby obtaining a partially steam reformed gas effluent and a hot gas stream of flue gas; (c) passing the effluent from the second reactor to an autothermal reformer; and (d) withdrawing from the autothermal reformer a hot gas stream of product gas rich in hydrogen and carbon monoxide.

4 Claims, 2 Drawing Sheets

US 7,060,118 B1

SYNTHESIS GAS PRODUCTION BY STEAM REFORMING

The present invention is directed to the production of synthesis gas by steam reforming of a hydrocarbon feedstock in contact with catalyzed hardware.

The term catalyzed hardware is used for a catalyst system, where a layer of catalyst is fixed on a surface of another material, e.g. metallic surfaces. The other material serves as the supporting structure giving strength to the system. This allows to design catalyst shapes which would not have sufficient mechanical strength in itself. The system herein consists of tubes on which a thin layer of reforming catalyst is placed on the inner wall.

Alternative layouts may comprise of tubes with a catalyst layer on the outside, plates with catalyst coating, or other suitable shapes.

Synthesis gas is produced from hydrocarbons by steam reforming by the reactions (1)–(3):

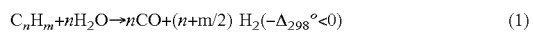

$$C_nH_m + nH_2O \rightarrow nCO + (n+m/2) H_2 (-\Delta_{298}° < 0) \quad (1)$$

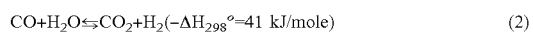

$$CO + H_2O \leftrightarrows CO_2 + H_2 (-\Delta H_{298}° = 41 \text{ kJ/mole}) \quad (2)$$

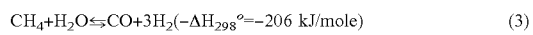

$$CH_4 + H_2O \leftrightarrows CO + 3H_2 (-\Delta H_{298}° = -206 \text{ kJ/mole}) \quad (3)$$

A second method for production of synthesis gas is autothermal reforming (ATR). In autothermal reforming, combustion of hydrocarbon feed is carried out with substoichiometric amounts of oxygen by flame reactions in a burner combustion zone and, subsequently, steam reforming of the partially combusted feedstock in a fixed bed of steam reforming catalyst. The oxidant can be air, enriched air, or pure oxygen.

A third method for production of synthesis gas is the combination of first passing the hydrocarbon feed through a fixed bed of reforming catalyst and, subsequently, passing the partly reformed feed through an autothermal reformer. The fixed bed may comprise of a number of tubes placed in a fired furnace. This combination is called two-step reforming or primary followed by secondary reforming and is particularly suited for production of synthesis gas for methanol and ammonia production. By controlling the amount of reforming occurring in the fixed bed steam reformer before the ATR, a synthesis gas having the correct stoichiometry for methanol synthesis or a synthesis gas having the correct ratio of hydrogen to nitrogen for ammonia synthesis can be produced.

State of the art steam reforming technology makes use of reforming catalyst in the form of pellets of various sizes and shapes. The catalyst pellets are placed in fixed bed reactors (reformer tubes). The reforming reaction is endothermic. In conventional reformers, the necessary heat for the reaction is supplied from the environment outside the tubes usually by a combination of radiation and convection to the outer side of the reformer tube. The heat is transferred to the inner side of the tube by heat conduction through the tube wall and is transferred to the gas phase by convection. Finally, the heat is transferred from the gas phase to the catalyst pellet by convection. The catalyst temperature can be more than 100° C. lower than the inner tube wall temperature at the same axial position of the reformer tube.

It has been found that heat transport is more efficient when catalyzed hardware is used in the steam reforming process. The heat transport to the catalyst occurs by conduction from the inner tube wall. This is a much more efficient transport mechanism than the transport by convection via the gas phase. The result is that the temperatures of the inner tube wall and the catalyst are almost identical (the difference below 5° C.). Furthermore, the tube thickness can be reduced, see below, which makes the temperature difference between the inner and outer side of the reformer tube smaller. It is hence possible to have both a higher catalyst temperature and a lower tube temperature, all other conditions being the same when replacing the conventional reformer tubes with catalyzed hardware tubes. A low outer tube wall temperature is desirable since it prolongs the lifetime of the tube. A high catalyst temperature is advantageous since the reaction rate increases with temperature and since the equilibrium of reaction (3) is shifted to the right hand side resulting in a better utilisation of the feed.

Pressure drop in the catalyzed reformer tube is much lower than in the conventional case for the same tube diameter. This enables the use of reactors of non-traditional shapes e.g. tubes with small diameter and still maintaining an acceptable pressure drop. Smaller tube diameter results in an increased tube lifetime, tolerates higher temperatures and reduces the tube material consumption.

Finally, the catalyst amount is reduced when using catalyzed hardware reformer tubes compared to the conventional reformer with a fixed bed of reforming catalyst.

The small amount of catalyst dictates the use of a feedstock free of catalyst poisons. This can e.g. be obtained by sending the feedstock through a prereformer.

BRIEF DESCRIPTION OF THE DRAWINGS

FIG. 1 shows an example of a plant producing syngas. Feed 2 is preheated, desulphurized in unit 4, mixed with process steam 6, and further heated before entering an adiabatic prereformer 8. The effluent stream from prereformer 8 is further heated in a heat exchanger coil arranged in flue gas channel 12 and send to the tubular reformer 14, where conversion of methane to hydrogen, carbon monoxide, and carbon dioxide occurs. The effluent gas is passed to autothermal reformer 16, wherein combustion is performed with oxidant stream 18. The processing of effluent gas 20 downstream from the autothermal reformer depends on the intended use of the product.

Figure 1:
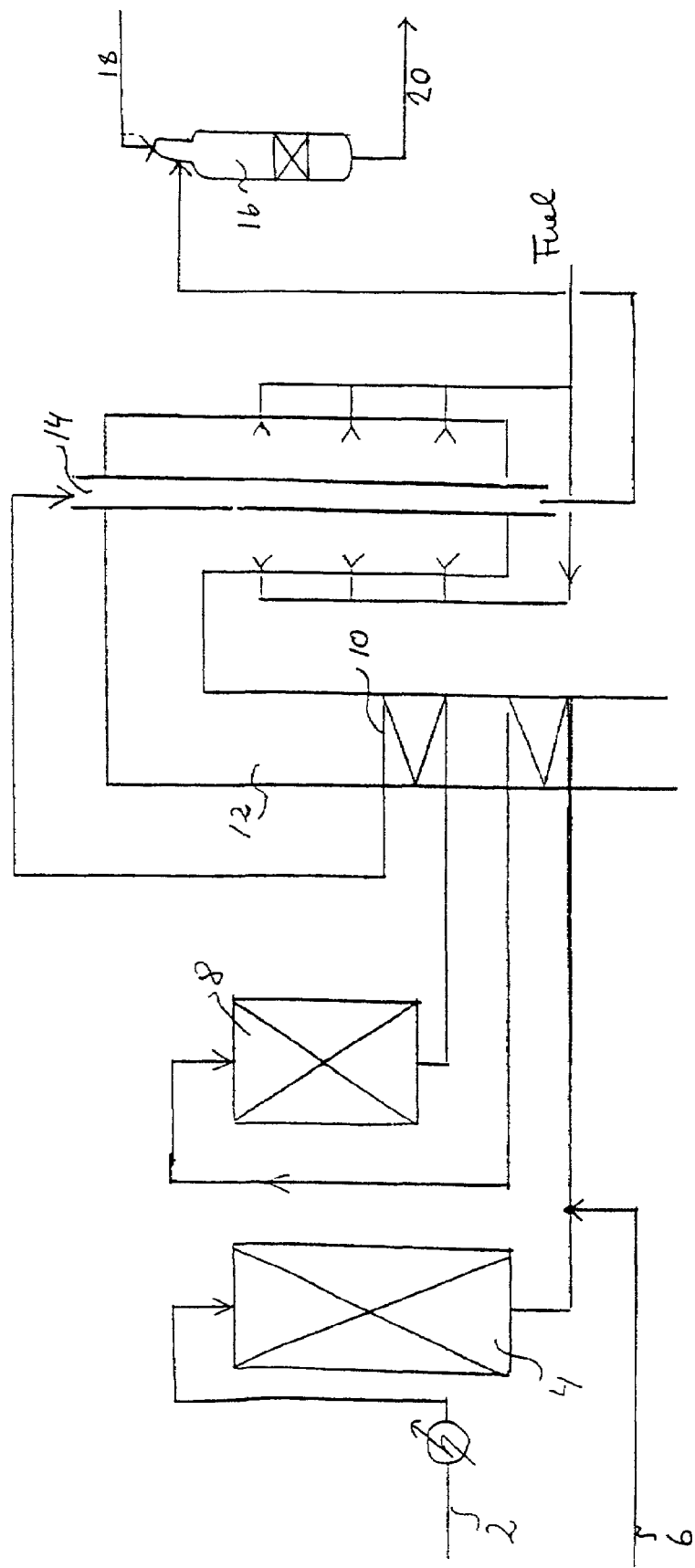
FIG. 1 shows an example of a plant producing syn gas.

Catalyzed hardware can be used in two of the units shown in FIG. 1:

1. In the preheater coil 10 for heating the prereformer effluent gas before entering the tubular reformer 14.

2. In the tubular reformer 14.

This invention provides process for the preparation of hydrogen and carbon monoxide rich gas by steam reforming of a hydrocarbon feedstock in presence of a steam reforming catalyst supported as thin film on the wall of a reactor, comprising steps of (a) optionally passing a process gas of hydrocarbon feedstock through a first reactor with a thin film of steam reforming catalyst supported on walls of the reactor in heat conducting relationship with a hot gas stream;

(b) passing effluent from the first reactor to a subsequent tubular reactor being provided with a thin film of steam reforming catalyst and/or steam reforming catalyst pellets and being heated by burning of fuel, thereby obtaining a partially steam reformed gas effluent and a hot gas stream of flue gas;

(c) passing the effluent from the second reactor to an autothermal reformer; and (d) withdrawing from the autothermal reformer a hot gas stream of product gas rich in hydrogen and carbon monoxide.

EXAMPLE 1

A catalyzed hardware reformer reactor has been tested. The test unit consists of a system for providing the feeds to the reactor, the reactor itself, and equipment for posttreatment and analysis of the effluent gas from the reactor.

The reactor consists of a ¼" tube of length 1050 mm which is, in the middle 500 mm, coated on the inner wall with RKNR nickel steam reforming catalyst. The catalyst has the same composition as the RKNR pelletshaped steam reforming catalyst available from Haldor Topsoe A/S. The thickness of the catalyst layer is 0.31 mm. The catalyzed reactor tube is placed in a casing made of solid metal, which has a hole closing tightly around the catalyzed tube. A number of milled grooves, in which thermocouples are placed, is made along the hole. One of the thermocouples is movable so that a wall temperature profile of the catalyzed tube can be obtained. Additionally, thermocouples are placed in the gas channel in the catalyzed tube measuring the gas temperature at the inlet to and the outlet from the catalyzed zone. The reactor with casing is placed in an electrically heated oven, in which the temperature can be controlled seperately in 6 different zones.

The feed steams consist of hydrogen, methane, carbondioxide, and steam. The feed streams are mixed and preheated before entering the reactor. After the reactor, the effluent gas stream is cooled down, the condensed water is separated from the gas, and the gas composition is measured by a gaschromatograph.

Figure 2:
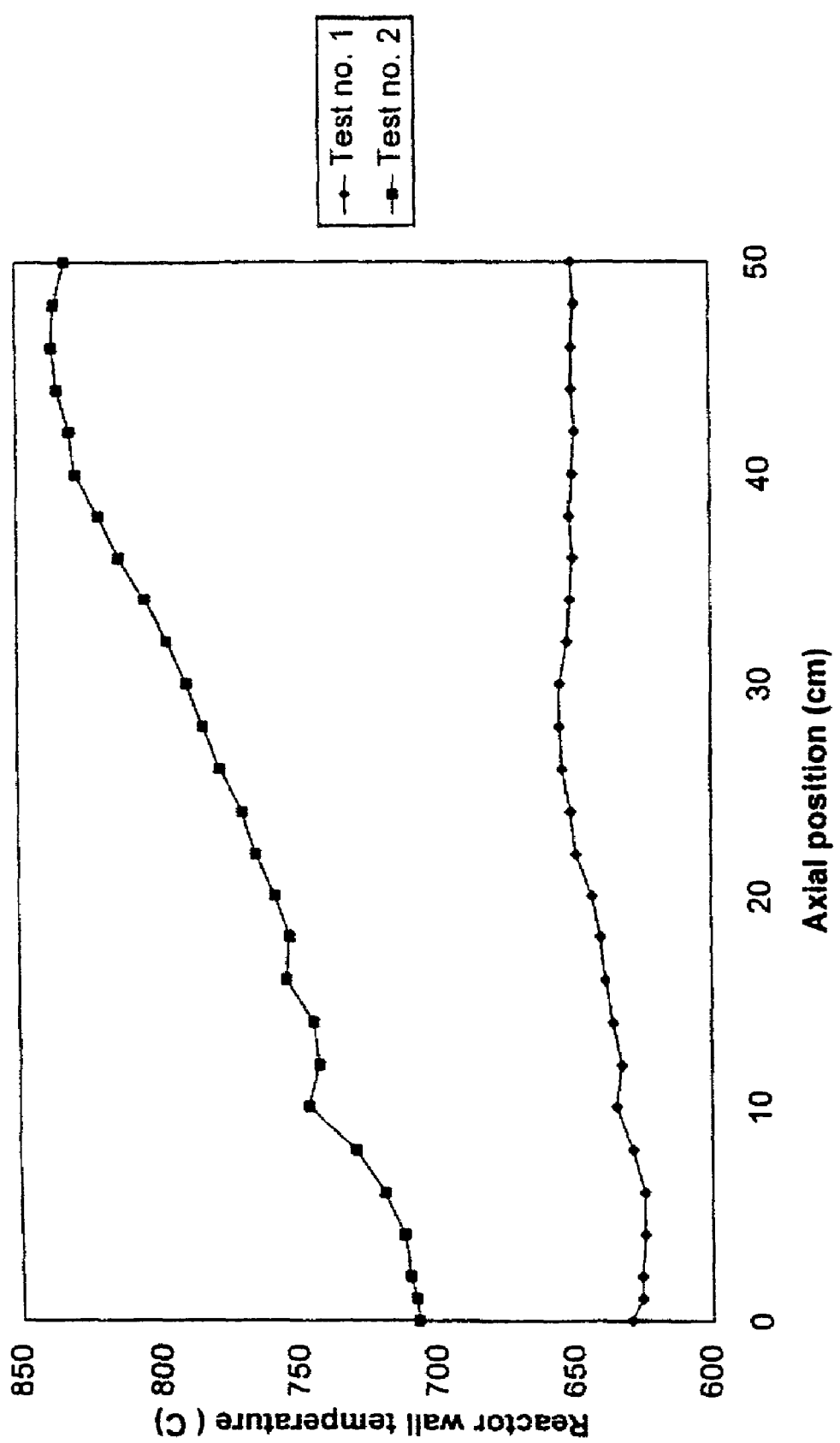
FIG. 2 shows the temperature profile imposed on the reactor wall measured by the movable thermocouple.

Two sets of conditions were tested. One set at lower temperature to simulate use of catalyzed hardware in a preheater coil (test No. 1), and one set at higher temperature to simulate a tubular reformer (test No. 2). The conditions are shown in Table 1. The pressure was in both cases 28 bar g. The temperature profile imposed on the reactor wall measured by the movable thermocouple is shown in FIG. 2.

TABLE 1

| Test No. | Gas temperature at inlet of catalyzed zone °C. | Gas temperature at outlet of catalyzed zone °C. | Hydrogen flow rate Nl/h | Methane flow rate Nl/h | Carbon-dioxide flow rate Nl/h | Steam flow rate Nl/h |
|---|---|---|---|---|---|---|
| 1 | 605 | 633 | 62.0 | 310.0 | 16.1 | 781.4 |
| 2 | 679 | 795 | 240.5 | 152.0 | 63.1 | 425.0 |

The measured effluent gas composition is shown in Table 2. The gas composition is on dry basis.

TABLE 2

Effluent Gas Composition on Dry Basis

| Test No. | Hydrogen mole % | Carbon-monoxide mole % | Carbon-dioxide mole % | Methane mole % |
|---|---|---|---|---|
| 1 | 49.6 | 2.48 | 11.4 | 36.5 |
| 2 | 67.8 | 10.8 | 9.80 | 11.7 |

The effluent gas is in both cases in equilibrium with respect to the reforming reaction at the outlet gas temperature within experimental uncertainty. This demonstrates that a conversion similar to a fixed bed reactor can be obtained in a catalyzed hardware reactor.

The invention claimed is:

1. A process for the preparation of hydrogen and carbon monoxide rich gas by steam reforming of a hydrocarbon feedstock in the presence of a steam reforming catalyst supported as thin film on a wall of a reactor, comprising the steps of:

(a) passing a process gas of hydrocarbon feedstock through a first reactor (10) having an inner wall and an outer wall, wherein a thin film of steam reforming catalyst is supported on the inner wall of the reactor (10), wherein the first reactor (10) is a preheater coil, and wherein the reactor (10) is in a heat conducting relationship with a hot gas stream of flue gas;

(b) passing effluent from the first reactor (10) to a subsequent tubular reactor (14) comprising at least one reformer tube having an inner wall and an outer wall and being provided with a steam reforming catalyst, wherein the steam reforming catalyst is a thin film of steam reforming catalyst supported on the inner wall of the at least one reformer tube and/or steam reforming catalyst pellets and wherein the at least one reformer tube is heated by burning of fuel, thereby obtaining a partially steam reformed gas effluent and the hot gas stream of flue gas;

(c) passing the effluent from the second reactor (14) to an autothermal reformer (16); and (d) withdrawing from the autothermal reformer (16) a hot gas stream of product gas (20) rich in hydrogen and carbon monoxide.

2. The process of claim 1, wherein the steam reforming catalyst comprises nickel and/or noble metals.

3. The process of claim 1, wherein the process gas of step a) is effluent from an adiabatic prereformer.

4. The process of claim 1, wherein the tubular reactor (14) comprises a plurality of reformer tubes having a thin film of steam reforming catalyst supported on the inner wall of the reformer tubes.

\* \* \* \* \*

UNITED STATES PATENT AND TRADEMARK OFFICE
CERTIFICATE OF CORRECTION

| | | |
|---|---|---|
| PATENT NO. | : 7,060,118 B1 | Page 1 of 1 |
| APPLICATION NO. | : 09/743528 | |
| DATED | : June 13, 2006 | |
| INVENTOR(S) | : Dybkjaer et al. | |

It is certified that error appears in the above-identified patent and that said Letters Patent is hereby corrected as shown below:

On the title page, Item (73) Assignee: please delete Topse and insert the following:
   --Topsøe--

On the title page, col. 1 Item (56), under the section "References Cited," "Foreign Patent Documents," please insert the following: --JP    51 55602     6/22/1993--

Signed and Sealed this

Twelfth Day of September, 2006

JON W. DUDAS
*Director of the United States Patent and Trademark Office*